United States Patent [19]

Mazaki et al.

[11] Patent Number: 5,526,150
[45] Date of Patent: Jun. 11, 1996

[54] LIQUID CRYSTAL POLYMER VIEWING ANGLE COMPENSATOR FOR LIQUID CRYSTAL DISPLAY HAVING ITS LARGEST REFRACTIVE INDEX IN THE THICKNESS DIRECTION

[75] Inventors: Hitoshi Mazaki, Kawasaki; Takehiro Toyooka; Hiroyuki Itoh, both of Yokohama, all of Japan

[73] Assignee: Nippon Oil Company, Limited, Tokyo, Japan

[21] Appl. No.: 183,722

[22] Filed: Jan. 19, 1994

Related U.S. Application Data

[63] Continuation-in-part of Ser. No. 916,528, Jul. 20, 1992, abandoned.

[30] Foreign Application Priority Data

Jul. 19, 1991 [JP] Japan .................... 3-203697

[51] Int. Cl.$^6$ ................................. G02F 1/1335
[52] U.S. Cl. ........................................... 359/73
[58] Field of Search ................................... 359/73

[56] References Cited

U.S. PATENT DOCUMENTS

| | | | |
|---|---|---|---|
| 4,293,435 | 10/1981 | Portugall et al. | 252/299.01 |
| 4,443,065 | 4/1984 | Funada et al. | 350/335 |
| 4,702,558 | 10/1987 | Coles et al. | 350/330 |
| 4,813,770 | 3/1989 | Clerc et al. | 350/347 |
| 4,892,675 | 1/1990 | Nohira et al. | 252/299.01 |
| 4,995,705 | 2/1991 | Yoshinaga et al. | 350/350 |
| 5,054,888 | 10/1991 | Jacobs et al. | 359/76 |
| 5,064,697 | 11/1991 | Takiguchi et al. | 428/1 |
| 5,067,797 | 11/1991 | Yokokura et al. | 359/76 |
| 5,073,294 | 12/1991 | Shannon et al. | 252/299.01 |
| 5,098,975 | 3/1992 | Omelis et al. | 526/312 |
| 5,472,635 | 12/1995 | Iida et al. | 359/73 |

FOREIGN PATENT DOCUMENTS

| | | |
|---|---|---|
| 63-149624 | 6/1988 | Japan . |
| 1-206318 | 8/1989 | Japan . |
| 2-105111 | 4/1990 | Japan . |
| 2-189518 | 7/1990 | Japan . |
| 2-285324 | 11/1990 | Japan . |
| 2-308128 | 12/1990 | Japan . |

*Primary Examiner*—Anita Pellman Gross
*Attorney, Agent, or Firm*—Scully, Scott, Murphy & Presser

[57] ABSTRACT

A viewing angle compensator for a liquid crystal display having characteristics such as being able to diminish the visual angle dependency of the liquid crystal display is provided. The viewing angle compensator of the present invention comprises a light transmitting base and a film of a liquid crystalline polymer formed on the base, the liquid crystalline polymer taking in the state of liquid crystal a structure wherein a refractive index in the thickness direction is larger than a refractive index in any direction within the plane of the polymer and assuming a glassy state at a temperature lower than the liquid crystal transition point thereof.

16 Claims, 4 Drawing Sheets

LIQUID CRYSTAL POLYMER VIEWING ANGLE COMPENSATOR FOR LIQUID CRYSTAL DISPLAY HAVING ITS LARGEST REFRACTIVE INDEX IN THE THICKNESS DIRECTION

RELATED U.S. APPLICATION

This application is a continuation-in-part of U.S. patent application Ser. No. 916,528 filed on Jul. 20, 1992, now abandoned.

FIELD OF THE INVENTION

The present invention relates to a viewing angle compensator for a display unit and to a process for compensating the viewing angle of a liquid crystal display. More particularly, the present invention is concerned with a viewing angle compensator for a liquid crystal display having reduced viewing angle dependency of the liquid crystal display.

BACKGROUND OF THE INVENTION

Liquid crystal display is occupying an important position, taking the place of the cathode-ray tube, because of such characteristic features as being driven at a low voltage, light weight and low cost. However, since the liquid crystal display adopts a means of displaying images by utilizing orientating behaviors of a liquid crystalline substance having an optical anisotropy, it inevitably involves the problem (hereinafter referred to as "viewing angle dependency") that the color tone of the screen changes according to direction of viewing the panel. That is, the visual angle dependency becomes more conspicuous when a color compensating optical elements such as a stretched film or a liquid crystal cell is mounted to the liquid crystal cell. For example, in the case of a lap-top type personal computer or a word processor display which utilize a twisted nematic mode ("TN" hereinafter) or a super-twisted nematic mode ("STN" hereinafter) liquid crystal cell, relatively good images are obtained when the screen is seen from the front. However, when the screen is seen from a direction other than the front, the screen is colored or it becomes difficult to see a clear image on the screen. Such viewing angle dependency of the display is not only undesirable to users but also is an obstacle to the production of a larger screen which is required for a wall-mounted TV or the like. In the case of a large screen display, as long as the prior art is used, it is impossible to obtain clear images throughout the entire screen because the marginal portion comes to have a certain viewing angle dependency even when the screen is seen from the front.

As a mean for diminishing such visual angle dependency of the display, it has been suggested to use a film having a refractive index in the thickness direction which larger than an intra-plane refractive index [M. Akatuka et al.: Japan Display '89, 336 (1989)]. Actually, however, such a film is scarcely existent, and even when it does exist, the difference between the refractive index in the thickness direction and the intra-plane refractive index is 0.001 or so (Japanese Patent Laid Open No. 85519/1991). Hence no effective remedy for the viewing angle dependency of liquid crystal displays have been yet obtained.

As a substance having a refractive index anisotropy, a liquid crystalline substance is promising however certain problems arise using such liquid crystalline substances. For example, in the case of a low molecular liquid crystal, it is difficult to maintain a stable orientation whereas in the case of a high molecular liquid crystal, it is impossible to obtain a uniform orientation.

The present inventors have already proposed an optical element constituted by a nematic liquid crystalline polymer film having a twisted structure as a color compensator for TN for liquid crystal display (Japanese Patent Application No. 165718/1990) and STN liquid crystal display (Japanese Patent Laid Open No. 87720/1991). But for further development of a viewing angle compensator for liquid crystal display having a higher function, the present inventors have taken note of a liquid crystalline polymer film having a large refractive index in the thickness direction and made extensive studies thereon. As a result, we accomplished the present invention.

It is the object of the present invention to provide a viewing angle compensator for a liquid crystal display unit and more particularly to provide a viewing angle compensator for a liquid crystal display unit using a liquid crystalline polymer film having a structure wherein a refractive index in the thickness direction is larger than a refractive index at least in one direction within the plane of the polymer and having an orientation state that is solidified.

Another object of the present invention is to provide a process for compensating the viewing angle display using the aforementioned liquid crystalline polymer film.

SUMMARY OF THE INVENTION

In one embodiment of the present invention, a viewing angle compensator for a liquid crystal display is provided which comprises a light transmitting substrate base and a film of a liquid crystalline polymer formed on the substrate, wherein said liquid crystalline polymer in the state of liquid crystal has a structure wherein a refractive index in the thickness direction is larger than a refractive index at least in one direction within the plane of the polymer and assuming a glassy state at a temperature lower than the liquid crystal transition point. In a second embodiment of the present invention there is provided a viewing angle compensator for a liquid crystal display wherein the liquid crystalline polymer is orientated in a homeotropic fashion in the state of liquid crystal.

In a third embodiment of the present invention there is provided a viewing angle compensator for a liquid crystal display wherein the liquid crystalline polymer is a polyester containing an ortho-substituted aromatic unit. In a fourth embodiment of the present invention there is provided a viewing compensator for a liquid crystal display using a film obtained by heat-treating a liquid crystalline polymer on a light transmitting substrate at a temperature higher than the glass transition point of the liquid crystalline polymer and then cooling the polymer to a temperature lower than the glass transition point to solidify the structure wherein said polymer has a refractive index in a thickness direction that is larger than a refractive index at least in one direction within the plane of the polymer. The present invention also provides a process for compensating the viewing angle of a liquid crystal display using the aforementioned liquid crystalline polymer film.

BRIEF DESCRIPTION OF THE DRAWINGS

FIG. 2 shows the results obtained in Example 3, representing a viewing angle-contrast relation when the STN test display is seen from above-below and right-left; and.

DESCRIPTION OF THE PREFERRED EMBODIMENTS

Figure 1:
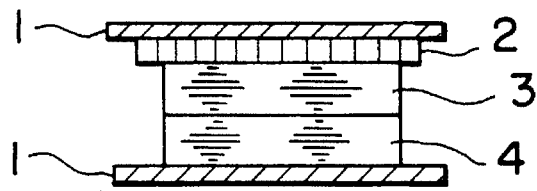
FIG. 1 is a sectional view showing the construction of a two-layer cell color-compensated type STN display and viewing angle compensator used in Example 3.

The present invention will be described in more detail hereinbelow.

The compensator of the present invention is produced by heat-treating, on a self-supporting substrate or a vertical alignment layer, a liquid crystalline polymer which takes a uniform, monodomain structure with a refractive index in the thickness direction being larger than a refractive index at least in one direction within the plane preferable at any direction within the plane, of the polymer and which permits this oriented state to be solidified easily, and solidifying the orientation in the state of liquid crystal.

As a typical example of an orientation behavior having a three-dimensional refractive index distribution required for the compensator of the present invention a homeotropic orientation is mentioned. The homeotropic orientation as referred to herein includes an inclined (or pretilted) structure at a certain angle (e.g. 45° or less) from the normal direction of the substrate, in addition to a structure wherein molecular major axes are oriented perpendicularly to the substrate. A liquid crystalline polymer capable of maintaining its orientation in the state of liquid crystal at room temperature or thereabouts stably is required to have the following property as an essential condition. In terms of a phase series of liquid crystal, it is important that there is no crystal phase present in a lower temperature region that the liquid crystal phase region. If such a crystal phase is present, an inevitable passage through the liquid crystal phase at the time of solidification results in destruction of the orientation once obtained, thus leading to unsatisfactory transparency and viewing angle compensating effect. In fabricating the compensator of the present invention, therefore, it is absolutely necessary to use a liquid crystalline polymer having glass phase in a lower temperature region than the crystal phase region. Although the liquid crystal phase of the liquid crystalline polymer is not specially limited, a nematic phase or smectic phase is usually mentioned.

As the liquid crystalline polymer used in the invention there may be employed any of liquid crystalline polymers taking in the state of liquid crystal a structure wherein a refractive index in the thickness direction is larger than a refractive index at least in one direction within the plane and assuming a glassy state at a temperature lower than the liquid crystal transition point thereof. Examples include main chain type liquid crystalline polymers such as polyesters, polyamides, polycarbonates, and polyester imides, as well as side chain type liquid crystalline polymers such as polyacrylates, polymethacrylates, polymalonates, and polysiloxanes. Particularly, polyesters are preferred in view of their easy preparation, good orientation and high glass transition point. Polyesters containing an ortho-substituted aromatic unit, are most preferred. Polymers containing as a repeating unit an aromatic unit having a bulky substituent group in place of an ortho-substituted aromatic unit or an aromatic unit having fluorine or a fluorine-containing substituent group, are also employable. The "ortho-substituted aromatic unit" as referred to herein means a structural unit with main chain-constituting bonds ortho to each other. Examples include catechol, salicylic acid and phthalic acid units as well as substituted derivatives thereof which are represented by the following formulas:

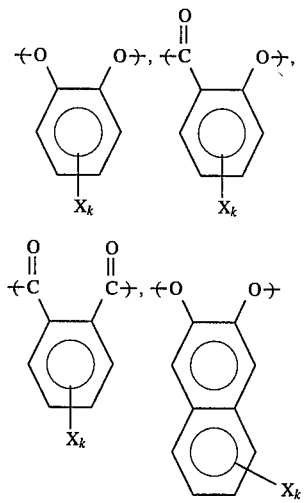

wherein X represents hydrogen, halogen, e.g. Cl or Br, an alkyl or alkoxy group having 1 to 4 carbon atoms, or phenyl, and k is 0 to 2.

The following are particularly preferred:

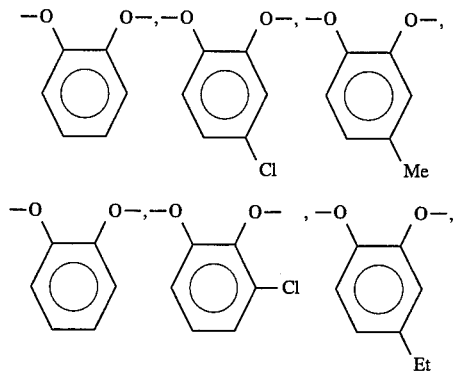

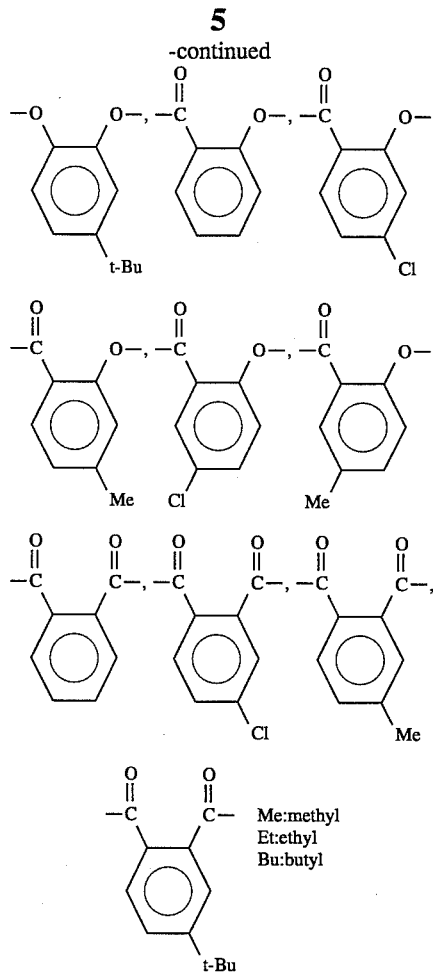

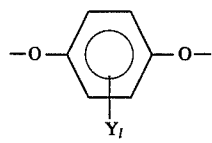
Me:methyl
Et:ethyl
Bu:butyl

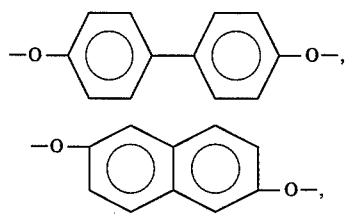

The polyester used in the present invention are those containing as repeating units (a) a diol component and (b) a structural unit derived from a hydroxycarboxylic acid ("hydroxycarboxylic acid component" hereinafter) containing both carboxyl and hydroxyl groups in one unit. Preferably, these polyesters also contain the foregoing ortho-substituted aromatic units.

Examples of suitable diol components that are employed in the present invention are aromatic and aliphatic diols having the following formulas:

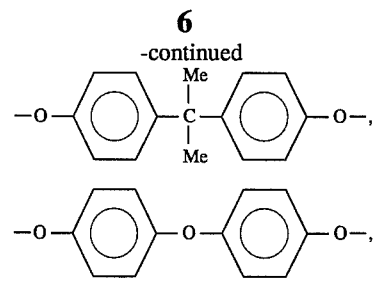

wherein Y represents hydrogen, halogen, e.g. Cl or Br, an alkyl or alkoxy group having 1 to 4 carbon atoms, or phenyl, and $l$ is 0 to 2,

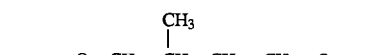

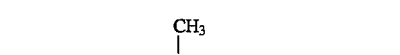

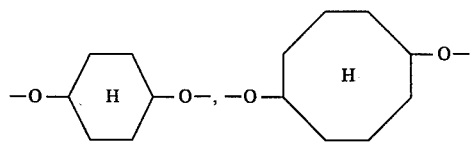

$-O+CH_2)_n O-$ (n is an integer of 2 to 12), $-O-CH_2-\overset{\underset{|}{CH_3}}{CH}-CH_2-CH_2-O-$, $-O-CH_2-CH_2-\overset{\underset{|}{CH_3}}{CH}-CH_2-CH_2-CH_2O-$,

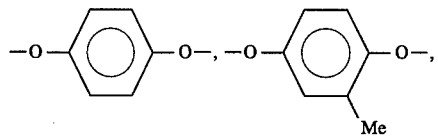

Particularly, the following diol components are preferred in the instant invention:

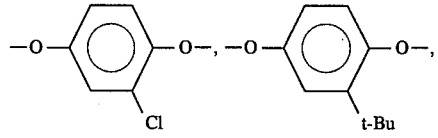

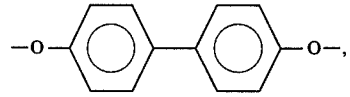

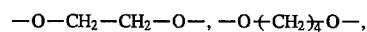

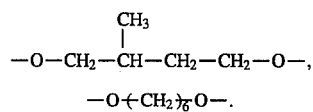

$-O-CH_2-\overset{\underset{|}{CH_3}}{CH}-CH_2-CH_2-O-$, $-O+CH_2)_6 O-$.

Examples of suitable dicarboxylic acid components that can be employed by the instant invention are represented by the following formulas:

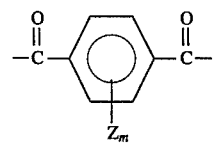

wherein Z represents hydrogen, halogen, e.g. Cl or Br, an alkyl or alkoxy group having 1 to 4 carbon atoms, or phenyl, and m is 0 to 2.

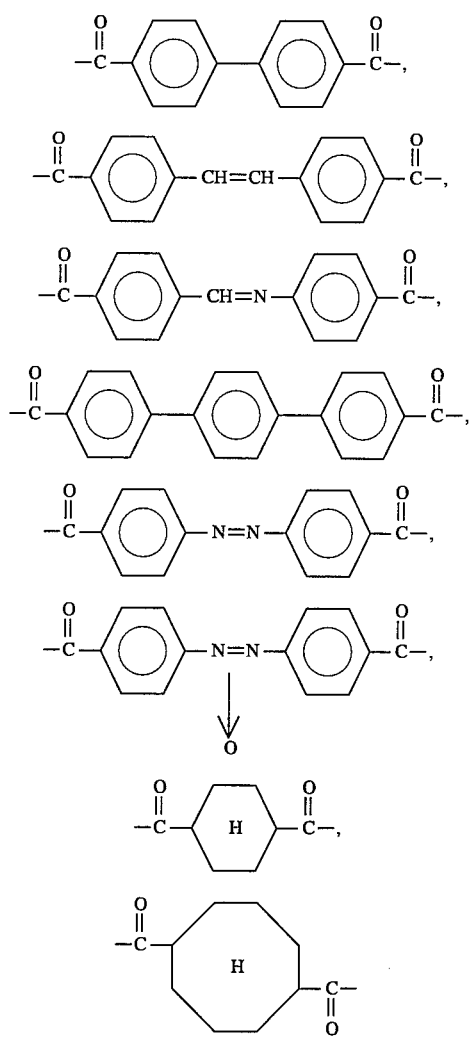

Particularly preferred dicarboxylic acid components are:

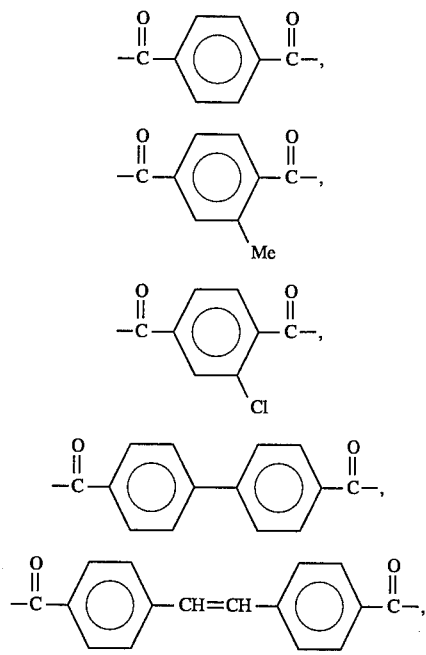

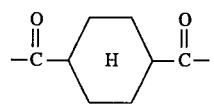

Examples of hydroxycarboxylic acid components that are employed in the present invention are represented by the following formulas:

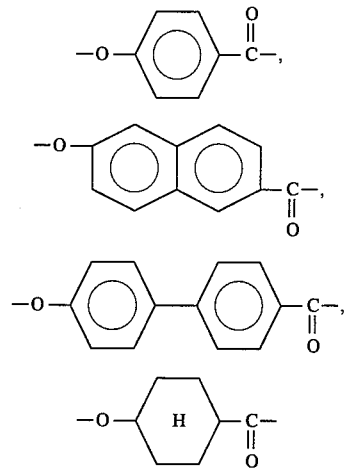

The dicarboxylic acid to diol mole ratio employed in the instant invention is approximately 1:1 like that of polyesters commonly used (carboxyl to hydroxyl ratio in the case of using a hydroxycarboxylic acid). The proportion of ortho-substituted aromatic units in the polyester is preferably in the range from about 5 to about 40 mole %, more preferably from about 10 to about 30 mole %. In the case where the proportion is smaller than 5 mole %, a crystal phase tends to appear under the liquid crystal phase, thus such proportion is not desirable. A proportion larger than 40 mole % is not desirable, either, because the polymer will no longer exhibit liquid crystallinity. The following are typical examples of polyesters which may be used in the present invention:

A polymer consisting essentially of the following structural units:

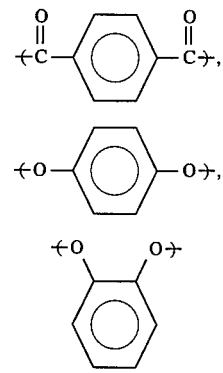

A polymer consisting essentially of the following structural units:

-continued

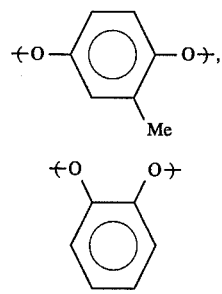

A polymer consisting essentially of the following structural units:

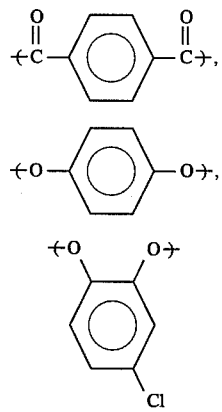

A polymer consisting essentially of the following structural units:

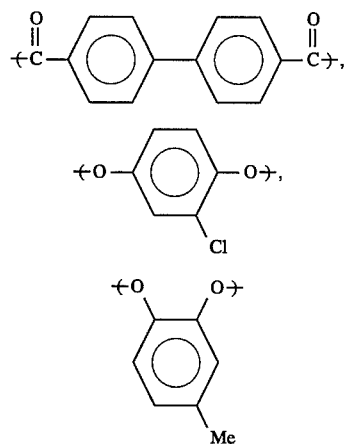

A polymer consisting essentially of following structural units:

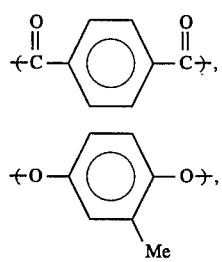

-continued

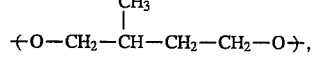

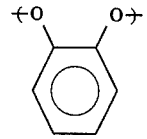

A polymer consisting essentially of the following structural units:

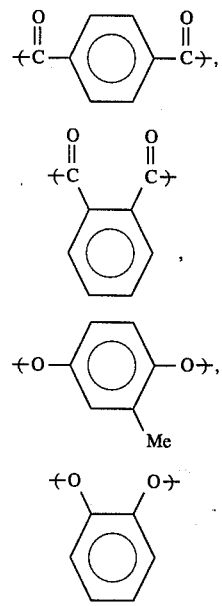

A polymer consisting essentially of the following structural units:

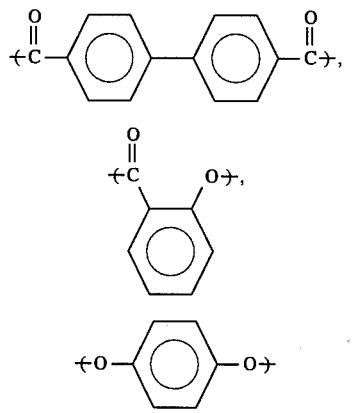

A polymer consisting essentially of the following structural units:

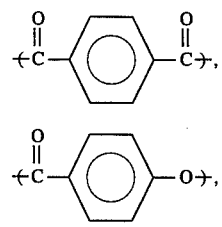

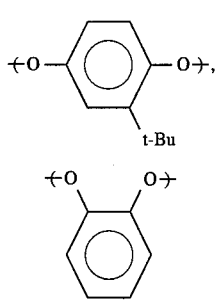

Preferred polymers which are used in place of ortho-substituted aromatic units, contain as repeating units bulky substituent containing aromatic units or aromatic units containing fluorine or fluorine-containing substituents as shown below:

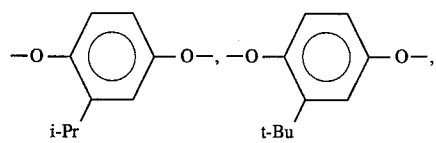

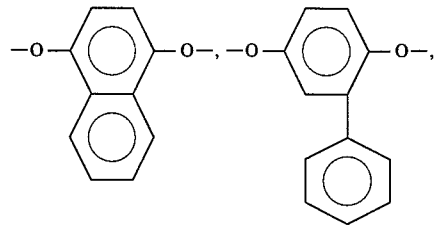

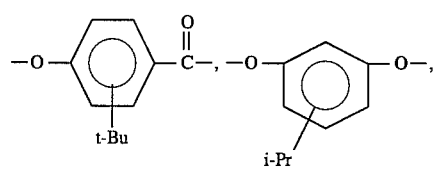

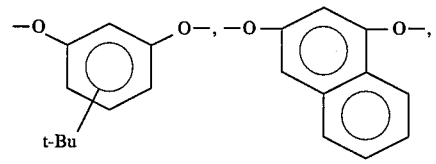

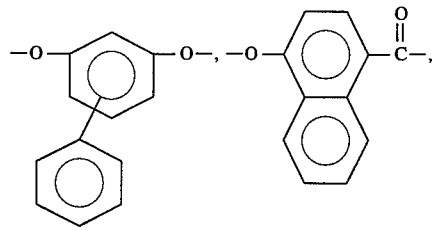

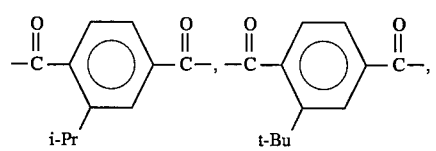

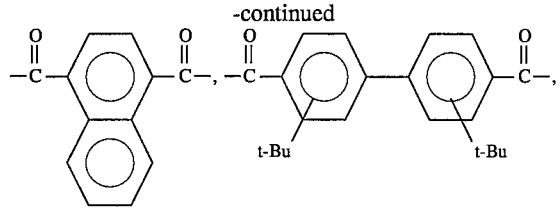

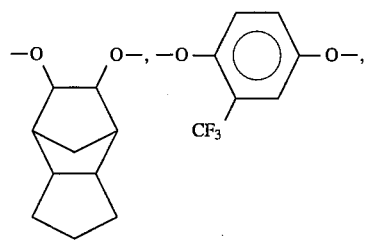

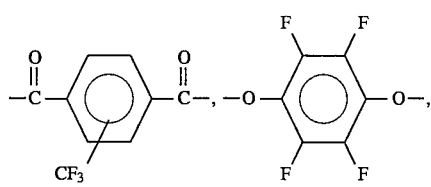

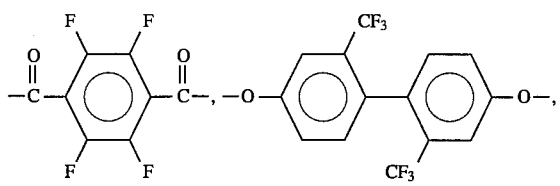

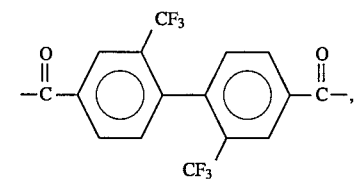

The polymers exemplified above range in molecular weight from about 0.05 to about 3.0, more preferably from about 0.07 to about 2.0, in terms of inherent viscosity as determined at 30° C. in a solvent, e.g. a mixed phenoltetrachloroethane [60/40 (weight ratio)] solvent. An inherent viscosity lower than 0.05 is not desirable because the strength of the resulting film of the polymer liquid crystal will be low, whereas if the inherent viscosity is higher than 3.0, there will arise such problems as the deterioration of orientability and an increase in the time required for orientation because of too high a viscosity during the formation of liquid crystal.

The glass transition temperature is usually higher than −10° C., preferably higher than 0° C., more preferably higher than 10° C. In the case of a glass transition point lower than −10° C., such a low temperature may cause a change in the liquid crystal structure, thus resulting in the deterioration of a function base on the liquid crystal structure.

The method of preparing the polymers used in the present invention are not specifically limited. Thus, any of the polymerization processes known in this field, e.g. a melt polymerization process or an acid chloride process using an acid chloride or a corresponding dicarboxylic acid, can be employed.

According to the melt polycondensation process, the polyester can be prepared by polymerizing a corresponding dicarboxylic acid and an acetylated compound of a corresponding diol at a high temperature and in a high vacuum. The molecular weight thereof can be adjusted easily by controlling the polymerization time or the feed composition. For accelerating the polymerization reaction a known metal salt such as sodium acetate can be used. In the case of using a solution polymerization process, the polyester can be prepared easily by dissolving predetermined amounts of a dicarboxylic acid dichloride and a diol in a solvent and then heating the resulting solution in the presence of an acid acceptor, such as pyridine.

Compositions obtained by mixing an optically active compound with such a liquid crystalline polyester containing ortho-substituted aromatic units, or liquid crystalline polymers obtained by incorporating optically active structures into polyesters containing ortho-substituted aromatic units can also be used in the present invention. Typical examples of optically active compounds that are employed in the instant invention are optically active low-molecular compounds. Any compound having optical activity can be used in the present invention, but from the standpoint of compatibility with the base polymer it is desirable to use optically active, liquid crystalline compounds. The following are concrete examples of the types of optical active compounds that can be employed herein:

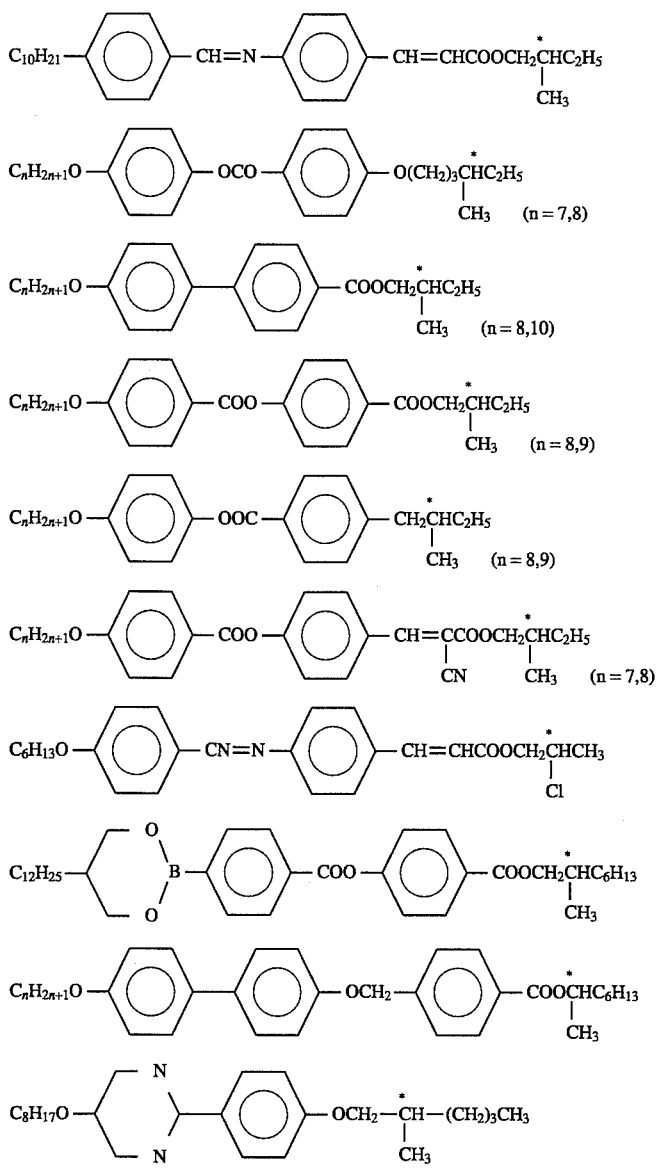

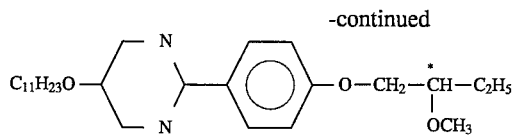

or cholesterol derivatives thereof.

A further example of optically active compounds that are used in the present invention are optically active high-molecular compounds. Any polymer may be used provided that it contains an optically active group in the molecule. However, when the compatibility with the base polymer is taken into account, it is desirable to use a high polymer which exhibits liquid crystallinity. Suitable liquid crystalline polymers having optical activity include: polyacrylates, polymethacrylates, polymalonates, polysilolxanes, polyesters, polyamides, polyester amides, polycarbonates, polypeptides, and cellulose. Above all, from the standpoint of compatibility with the liquid crystalline polymer, mainly aromatic optionally active polyesters are most preferred. Examples of aromatic optionally active polymers are as follows:

A polymer comprising the following structural units:

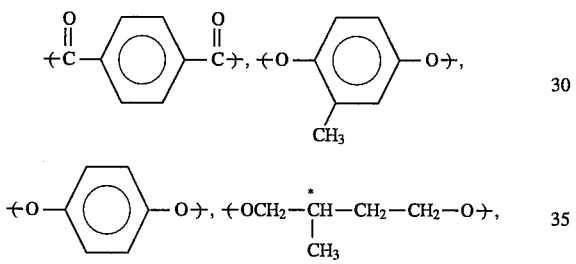

A polymer comprising the following structural units:

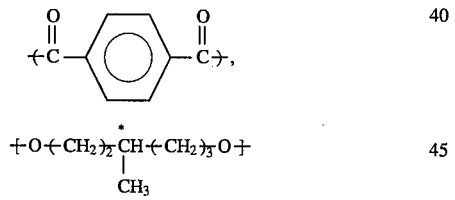

A polymer comprising the following structural units:

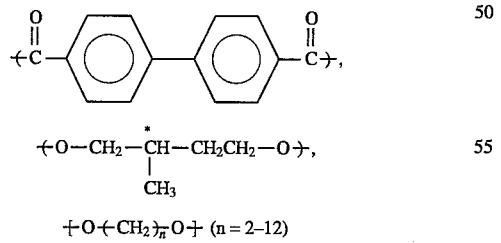

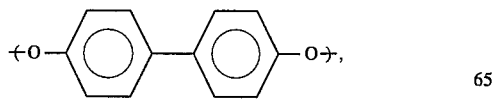

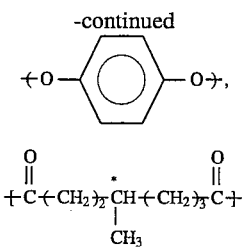

A polymer comprising the following structural units:

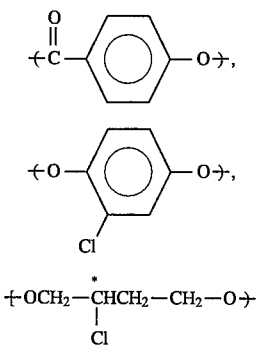

A polymer comprising the following structural units:

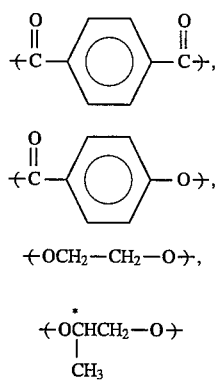

A polymer comprising the following structural units:

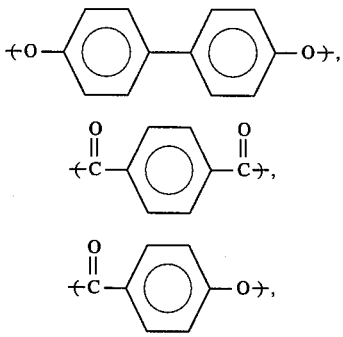

-continued
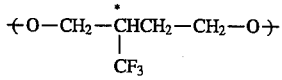

A polymer comprising the following structural units:

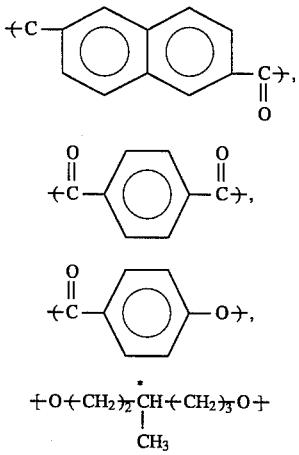

A polymer comprising the following structural units:

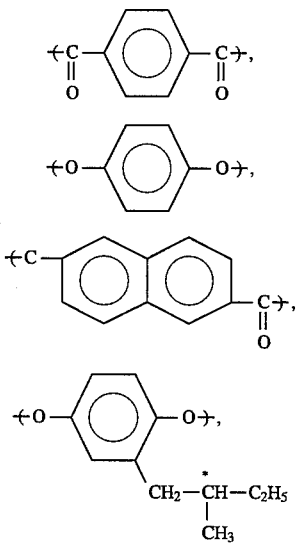

A polymer comprising the following structural units:

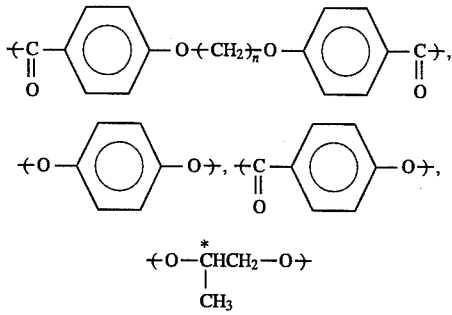

A polymer comprising the following structural units:

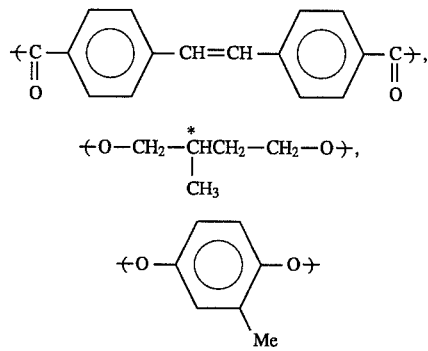

In each of these polymers, the proportion of the unit having an optically active group is usually in the range of about 0.5 to about 80 mole %, preferably from about 5 to about 60 mole %.

These polymers preferably range in molecular weight from about 0.05 to about 5.0 in terms of inherent viscosity as determined at 30° C. in phenol/tetrachloroethane. An inherent viscosity larger than 5.0 is not desirable because too high a viscosity eventually causes the deterioration of the orientability of the polymer. An inherent viscosity smaller than 0.05 is not desirable either because it becomes difficult to control the composition.

Such a composition can be prepared by mixing a liquid crystalline polyester and an optically active compound at a predetermined ratio by solid mixing, solution mixing or melt-mixing method. The proportion of the optically active component in the composition is in the range from about 0 to about 50 wt. %, more preferably from about 0 to about 30 wt. %, although it differs depending on the proportion of optically active groups contained in the optically active compound. If the proportion of the optically active compound is more than 50 wt. %, the compatibility of the optically active compound and the polyester containing ortho-substituted aromatic units is bad in the liquid crystal state thereby exerting an adverse influence on the orientation.

The compensator of the present invention can also be prepared by using a polymer which has an optically active group in the main chain and be optically active, which has a structure wherein a refractive index in the thick direction is greater than that in at least one direction within the plane, preferably at any direction within the plane, of the polymer and which permits the state of the orientation to be immobilized easily. Examples are main chain type liquid crystalline polymers such as polyesters, polyamides, polycarbonates and polyester imides, as well as side chain type liquid crystalline polymers such as polyacrylates, polymethacrylates and polysiloxanes. Polyesters are particularly preferred in view of their easy preparation, superior orientability and high glass transition point. Most preferred polyesters are those which contain ortho-substituted aromatic units as constituents. But also employable are polymers which, in place of such ortho-substituted aromatic units, contain as constituents bulky substituent-containing aromatic units or aromatic units having fluorine or fluorine-containing substituent groups. These optically active polyesters can be obtained by introducing in the aforementioned liquid crystalline polyesters optically active groups as shown below using diols, dicarboxylic acids and hydroxycarboxylic acids (the * mark in the following formulas represents an optically active carbon):

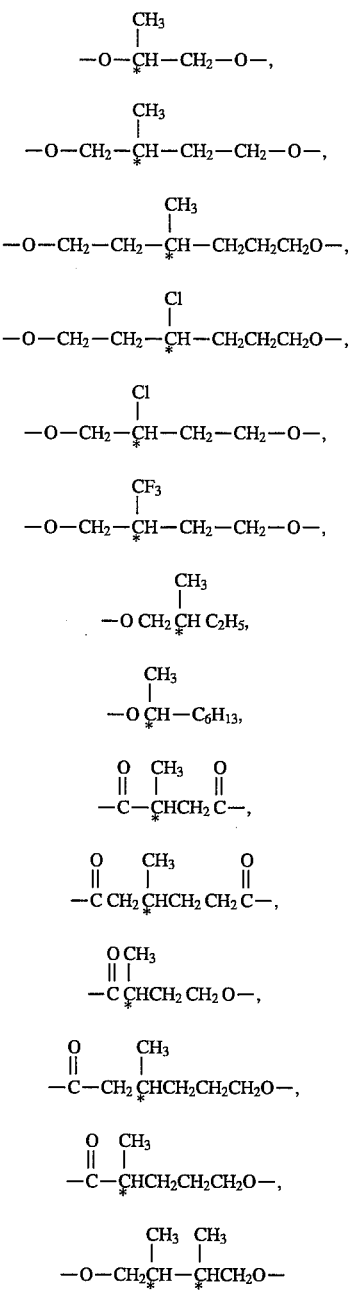

The proportion of these optically active groups in the polymers is in the range from about 0 to about 45 mole %, more preferably from about 0 to about 35 mole %. If the said proportion is more than 45 mole %, the orientability in the liquid crystalline stage will become bad. The molecular weights of these polymers are in the range from about 0.05 to about 3.0, more preferably from about 0.07 to about 2.0, in terms of inherent viscosity as determined at 30° C. in, for example, a mixed phenol/tetrachloroethane (60/40) solvent. A smaller inherent viscosity lower than 0.05 is not desirable because the strength of the resulting high molecular liquid crystal will be low, whereas if the intrinsic viscosity is larger than 3.0, problems, such as deterioration of orientability and an increase of the time required for orientation arise.

The glass transition temperature is usually higher than −10° C., preferably higher than 0° C., more preferably higher than 10° C. If the glass transition point is lower than −10° C., it may cause a change of the immobilized liquid crystal structure, thus resulting in deterioration of a function based on the liquid crystal structure.

These polymers can be prepared by the aforementioned melt polycondensation process or acid chloride process.

The following are typical examples of the liquid crystalline polymer used in the present invention described above.

Polymers represented by:

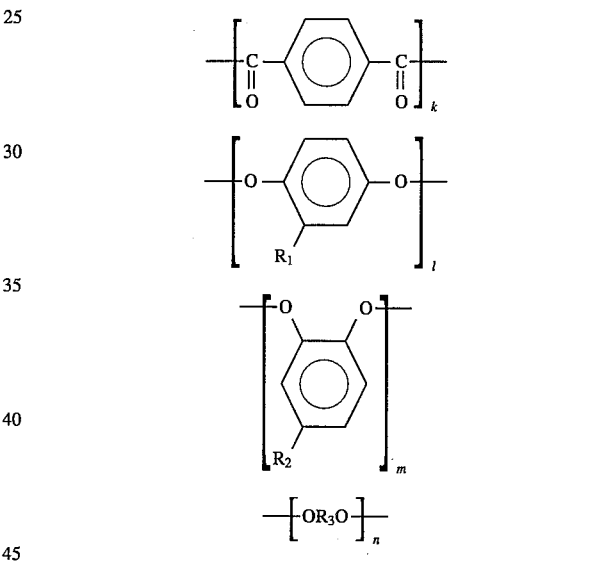

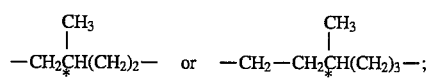

wherein $R_1$ and $R_2$ ar each $H_2$, halogen (such as Cl), or a linear or branched alkyl containing from 1 to 6 carbon atoms, and $R_3$ is $$-CH_2\overset{*}{C}H(CH_2)_2- \quad \text{or} \quad -CH_2-CH_2\overset{*}{C}H(CH_2)_3-;$$

$k=l+m+n$, $k/n=100/0\sim60/40$, preferably $100/0\sim80/20$, and $l/m=5/95\sim95/5$, preferably $20/80\sim80/20$.

A polymer mixture represented by:

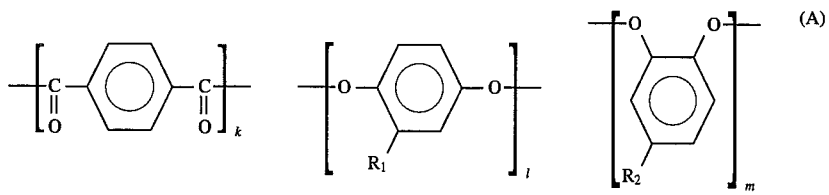

(A)

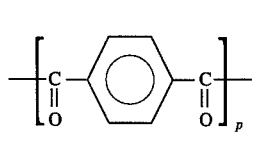 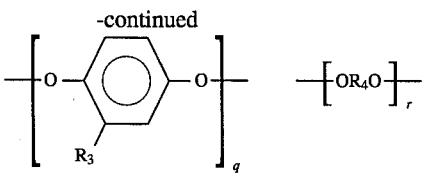

wherein (A)/(B)= usually 100/0–60/40, preferably 160/0–80/20, k=l+m, l/m=5/95, p=q+r, q/r=10/90–90/10, $R_1$, $R_2$ and $R_3$ are each $H_2$, halogen (such as Cl), or a linear or branched alkyl containing from 1 to 6 carbon atoms, and $R_4$ is

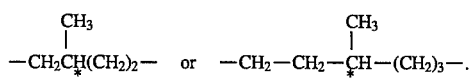

A polymer represented by:

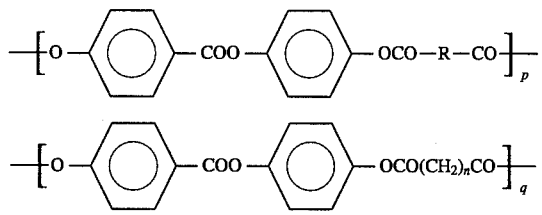

wherein p/q=0.5/99.5–40/60, preferably 1/99–20/80, n is an integer of 2–5, and R is

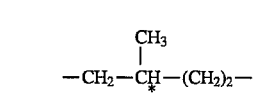

an optional optical purity.

A polymer represented by:

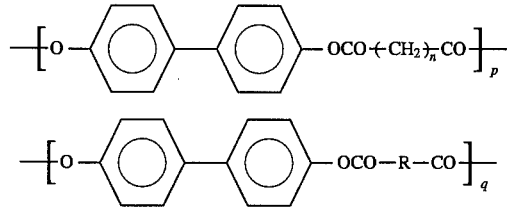

wherein p/q=99.9/0.1–70/30, preferably 99.5/0.5–80/20, more preferably 99/1–90/10, n is an integer of 2–8, and R is

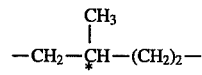

having an optional optical purity.

A polymer mixture represented by:

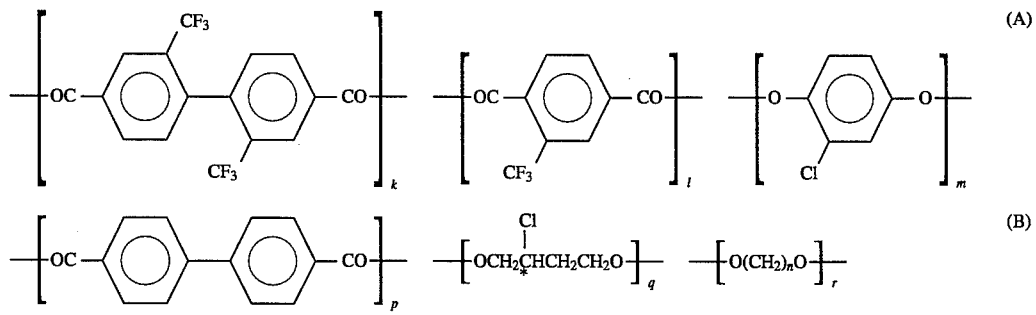

wherein (A)/(B)=usually 100/0–70/30, preferably 99.9/0.1–80/20, more preferably 99/1–85/15, k=l+m, m=10/90–90/10, p=q+r, q/r=10/90–80/20, n is an integer of 2–8.

A polymer represented by:

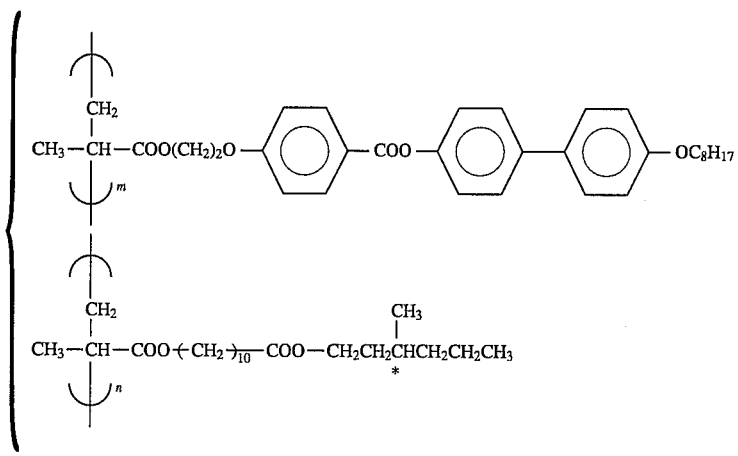

wherein m/n=usually 99.9/0.1–60/40, preferably 99.5/0.5–80/20.

A polymer presented by:

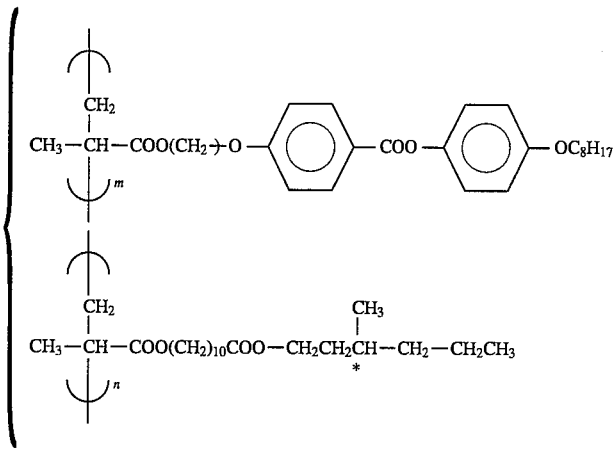

wherein m/n=usually 99.9/0.1–60/40, preferably 99.5/0.5–80/20.

As stated hereinabove, the mark * represents an optically active carbon.

These polymers range in molecular weight preferably from about 0.05 to about 3.0, more preferably from about 0.07 to about 2.0, in terms of inherent viscosity as determined at 30° C. in a solvent, e.q. tetrahydrofuran, acetone, cyclohexanone, or mixed phenol/tetrachloroethane (60/40) solvent. If the inherent viscosity is smaller than 0.05, the strength of the resulting liquid crystalline polymer will be low, whereas a value larger than 3.0 will result in too high a viscosity during the formation of liquid crystal, thus causing deterioration of the orientability of the liquid crystal and an increase in the time required for orientation.

A typical construction example of the compensator of the present invention is a two-layer structure comprising a light transmitting substrate and a liquid crystalline polymer film formed thereon. Examples of the light transmitting bases, i.e. substrates, that are employed in the present invention include light transmitting glasses, plastic sheets and polarizing films. Suitable light transmitting glasses include, for example, soda glass, silica-coated soda glass, or borosilicate glass. In regard to the plastic substrate, it is preferable for the plastic substrate to be optically isotropic. For example, polymethyl methacrylate, polystyrene, polycarbonate, polyether sulfone, polyphenylene sulfide, amorphous polyolefin, triacetyl cellulose, or epoxy resin may be used in the instant invention. Above all, polymethyl methacrylate, polycarbonate, polyether sulfone, amorphous polyolefin and triacetyl cellulose are most preferred.

Even by using a light transmitting base with a vertically orienting agent, such as a silanizing agent, lecithin or chromium complex formed thereon, it is possible to obtain a liquid crystal structure wherein a refractive index in the thickness direction is larger than a refractive index at least in one direction with the plane, preferably in any direction within the plane, of the polymer. By forming a liquid crystalline polymer film on the light transmitting base which has not been subjected to a parallel orientation treatment or has been subjected to a vertical orientation treatment, the compensator product will have a viewing angle compensating effect.

In accordance with the process of the instant invention, the liquid crystalline polymer is applied onto the base in the state of a solution or in a melted state. A solution of the liquid crystalline polymer is obtained by dissolving a predetermined concentration of the polymer in a predetermined solvent. In the case of using a composition comprising two or more kinds of polymers, for example in the case of solution mixing, the components are dissolved in a solvent at predetermined proportions to prepare a solution of a predetermined concentration.

Typical solvents which are employed in the instant invention vary depending on the kind of polymers used, but usually ketones, such as acetone, methyl ethyl ketone, and cyclohexanone, N-methylpyrrolidone, ethers such as tetrahydrofuran and dioxane, halogenated hydrocarbons, such as chloroform, dichloroethane, tetrachloroethane, trichloroethylene, tetrachloroethylene and o-dichlorobenzene, mixed solvents thereof with phenol, as well as dimethylformamide, dimethylacetamide and dimethyl sulfoxide are employed. The concentration of the solution greatly differs depending on the viscosity of polymer used, but usually it is in the range from about 5% to about 50%, preferable from about 8% to about 30%. The solution is then applied onto a light transmitting substrate such as a light transmitting glass sheet, plastic sheet or plastic film which has not been subjected to a parallel orientation treatment or has been subjected to a vertically orientation treatment. Typical polymer solution coating methods there may be employed in the present invention include spin coating method, roll coating method, printing method, curtain coating method, or dipping/pulling up method. After coating, the solvent is removed by drying and then heat treatment is performed at a predetermined temperature for a predetermined time to complete a liquid crystal orientation of monodomain. As to the heat treatment temperature, the higher the temperature, the better, because it is possible to lower the polymer viscosity. It should be mentioned, however, that too high a temperature is not desirable because it causes an increase of cost and deterioration of the working efficiency or may cause a thermal deformation of the film in the case of using a plastic film. Certain polymers having an isotropic phase in a higher temperature region than the liquid crystal phase, so even if heat treatment is made in this temperature region, orientation will not be obtained. Thus, it is desirable that the heat treatment is performed at a temperature above the glass transition point of the polymer and below the transition point thereof to obtain an isotropic phase. Usually, the range of 50° C. to 300° C. is preferable and the range of 100° C. to 250° C. is more preferable. The heat treatment time required for attaining a satisfactory orientation differs depending on the composition and molecular weight of polymer used, but preferably it is in the range of about 5 seconds to about 120 minutes, more preferably from about 10 seconds to about 60 minutes. If the time is shorter than 5; seconds, the orientation obtained will be unsatisfactory, whereas if the time exceeds 120 minutes, the transparency of the resulting compensator may be deteriorated. The same state of orientation can also be obtained by applying the polymer in a melted state onto the substrate which has not been subjected to a parallel orientation or has been subjected to the vertically orientation treatment, followed by heat treatment. By performing the treatments described above using the liquid crystalline polymer of the present invention a structure can be obtained in the state of liquid crystal wherein a refractive index in the thickness direction is larger than a refractive index at least in one direction within the plane of the polymer.

By subsequent cooling to a temperature below the glass transition point of the liquid crystalline polymer, the orientated state thus obtained can be solidified without impairing the orientation. Generally, in the case of using a polymer having a crystal phase in a lower temperature region than the liquid crystal phase region, the orientation in the state of a liquid crystal will be destroyed by cooling. According to the method of the present invention, such a phenomenon does not occur because a polymer having a glass phase in a region lower than the temperature region which exhibits crystal phase is used. Further, in the present invention, it is possible to completely solidify the structure in which the refractive index in the thickness direction is larger than that at least in one direction within the plane of the polymer.

The cooling rate is not specially limited. Such orientation is solidified by mere transfer from within the heating atmosphere into an atmosphere held at a temperature below the glass transition point of the liquid crystalline polymer. For enhancing the production efficiency a forced cooling, such as air cooling or water cooling, may be used. The fill thickness after the solidification is preferably in the range of 0.1 μm to 50 μm, more preferably 0.5 μm to 40 μm.

In order for the viewing angle compensator of the present invention to exhibit a satisfactory viewing angle compensating effect, it is necessary to effect matching of the refractive index in the three-dimensional direction of the layer (compensating layer) of the liquid crystalline polymer film according to a liquid crystal display cell. The control of the refractive index in the three-dimensional direction of the compensating layer can be attained by suitably selecting the kind of polymer or by mixing two or more kinds of polymers, provided in both cases it is essential that the refractive index in the thickness direction is larger than that at least in one direction within the plane of the polymer. The difference between the refractive index in the thickness direction and the refractive index at least in one direction within the plane of the polymer is usually not less than 0.01, preferably not less than 0.05. At this time, the control of the compensating layer thickness must done, but it is not so strict if only the fill thickness can be reproduced within an error range of usually ±10%, preferably ±5%. With such a degree of error, there is no visible difference with respect to the viewing angle compensating effect.

The viewing angle compensator thus obtained may be used as it is, or a protective layer of a transparent plastic material may be formed on the surface of the compensator for the protection of the surface. Alternatively, it may be used in an integrated form with another optical element such as a polarizing plate for example.

The liquid crystalline polymer film formed in the manner described above exhibits a viewing angle compensating effect for a liquid crystal display having a twist angle in the range of about 70° to about 300°. For example, it can remedy the visual angle dependency of TN display or STN display. The position where the viewing angle compensator is to be mounted is not limited provided that it is between a liquid crystal display cell and an overlying polarizing plate. For example, in the case where a color compensator is used above the liquid crystal display cell, the viewing angle compensator may be disposed between the polarizing plate and the color compensator or between the color compensator and the liquid crystal display cell. The compensator may be used by one plate or two or more plates may be placed between overlaying and underlaying polarizing plates.

Thus, the viewing angle compensator produced by the present invention can diminish the viewing angle dependency peculiar to a liquid crystal display, thereby not only contributing to upgrading a liquid crystal display but also for producing a large area of a liquid crystal display. Hence, the viewing angle compensator according to the present invention is of extremely great industrial value.

(EXAMPLES)

The following examples are given to further illustrate the present invention, but it is to be understood that the invention is not limited thereto. The following analyzing methods were used in those examples.

(1) Determination of Polymer Composition

Polymer was dissolved in deuterated chloroform or deuterated trifluoracetic acid and the polymer composition was determined using $^1$H-NMR or 400 MHz (JNM-GX4000, a product of Japan Electron Optics Laboratory Co., Ltd.).

(2) Determination of Inherent Viscosity

Determined in a mixed phenol/tetrachloroethane solvent (60/40 weight ratio) at 30° C. using a Ubbelohde's viscometer.

(3) Determination of Liquid Crystal Phase Series

Determined by measurement using DSC (DuPont 990 Thermal Analyzer) and observation using an optical microscope (BH2 Polarizing Microscope, a Product of Olympus Optical Co., Ltd.).

(4) Determining Stereostructure of Liquid Crystalline Polymer Film after Solidifying of Orientation A refractive index in the three-dimensional direction was measured using Abbe's refractometer (Type-4, a product of Atago K.K.), and a structure was determined by observation using a conoscope attached to an optical microscope.

Example 1

Using 100 mmol of terephthalic acid, 50 mmol of methylhydroquinone diacetate, 50 mmol of tertbutylcatecho) diacetate, and 100 mg of sodium acetate, polymerization was conducted in a nitrogen atmosphere at 300° C. for 1 hour. The resulting polymer was dissolved in tetrachloroethane and thereafter reprecipitation was made using methanol to afford 25.0 g of purified polymer. The polymer had an inherent viscosity of 0.14, a nematic phase as a liquid crystal phase and a glass transition point of 130° C.

Using this polyester, there was prepared a 10 wt. % solution thereof in tetrachloroethane. The solution was applied onto a pyrex plate having a size of 10 cm×10 cm and a thickness of 1.1 mm by a screen printing method, then dried, heat-treated at 220° C. for 30 minutes and then cooled to obtain a viewing angle compensator having a compensating layer thickness of 3.5 μm. The compensator was completely transparent, and upon conoscope observation it proved to have a positive crystal structure of homeotropic orientation.

Example 2

The polymer solution described in Example 1 was cast onto a high refraction glass plate (a product of Hoya Glass Works, Ltd., refractive index: 1.84), followed by drying and heat treatment in the same way as in Example 1. As a result, there was obtained a transparent film 3.0 μm in thickness having a refractive index of 1.54 in all of directions parallel to the substrate and a refractive index of 1.72 in the thickness direction.

Comparative Example 1

The polymer solution described in Example 1 was applied onto a glass plate having a rubbed polyimide film, then dried and heat-treated at 220° C. for 30 minutes to afford a transparent film 3.4 μm thick. The polymer exhibited a homogeneous nematic orientation.

Example 3

The viewing angle compensator obtained in Example 1 was disposed on a two-layer cell type color-compensated STN display in such a manner that the compensating layer was located on the upper side, as shown in FIG. 1.

Figure 2A:
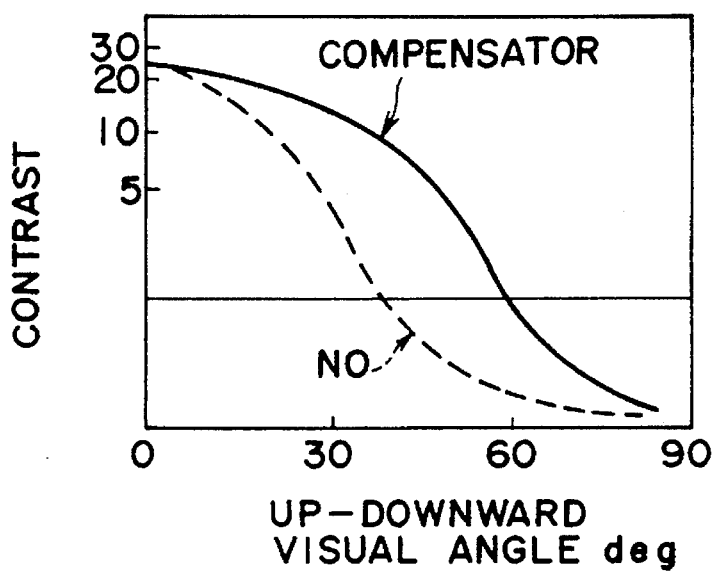
Figure 2B:
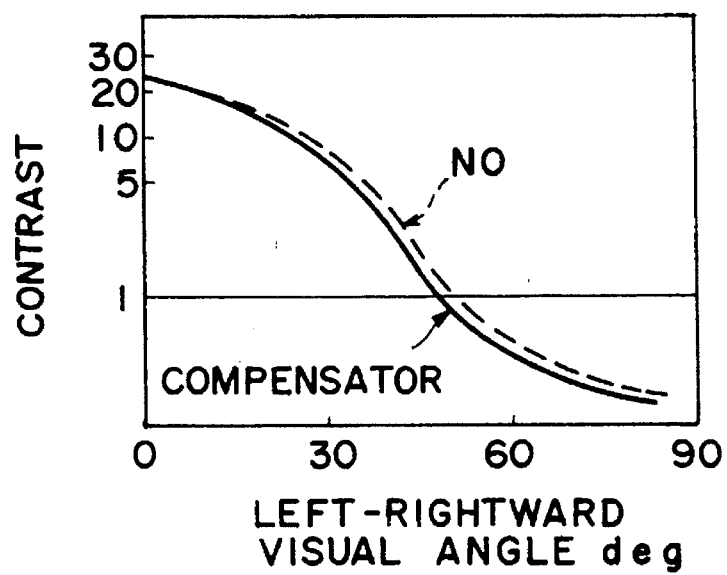
Figure 3A:
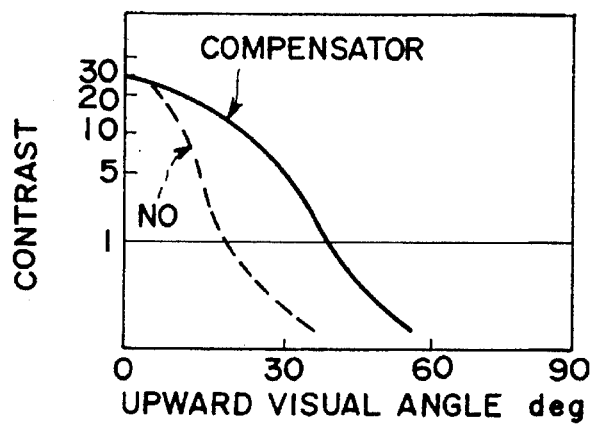
FIG. 3 shows the results obtained in Example 5, representing a viewing angle-contrast relation when a TN test display is seen from above, below, right and left.
Figure 3B:
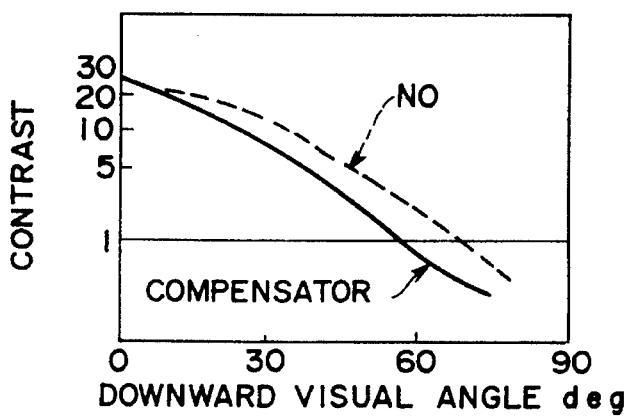
Figure 3C:
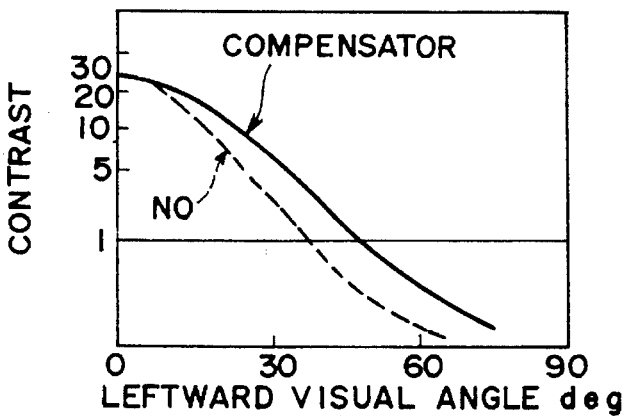
Figure 3D:
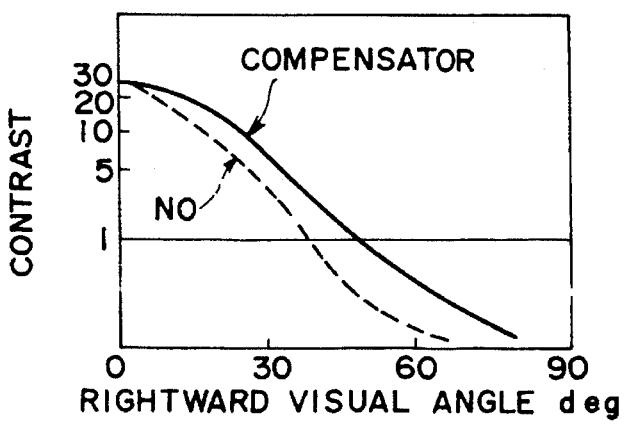
Figure 5A:
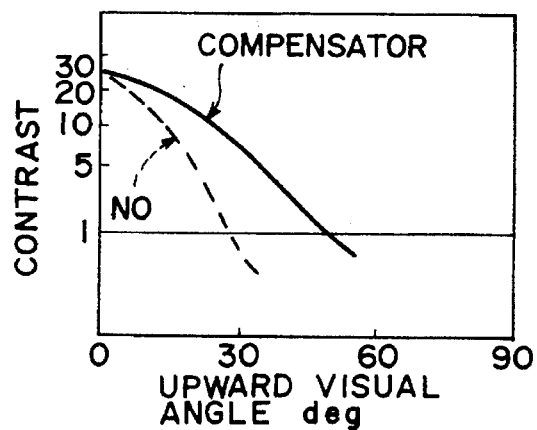
FIG. 5 shows the results obtained in Example 10, representing a viewing angle-contrast relation when the STN test display is seen from above, below, right and left.
Figure 5B:
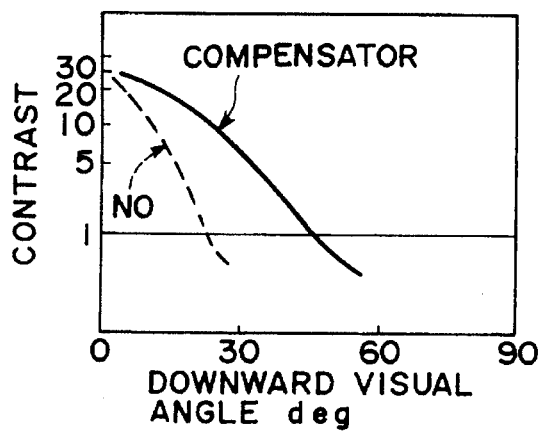
Figure 5C:
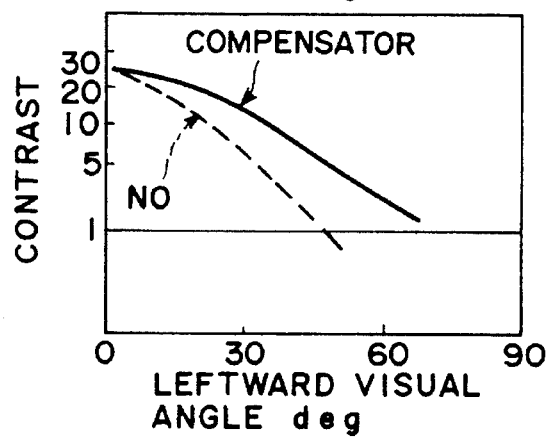
Figure 5D:
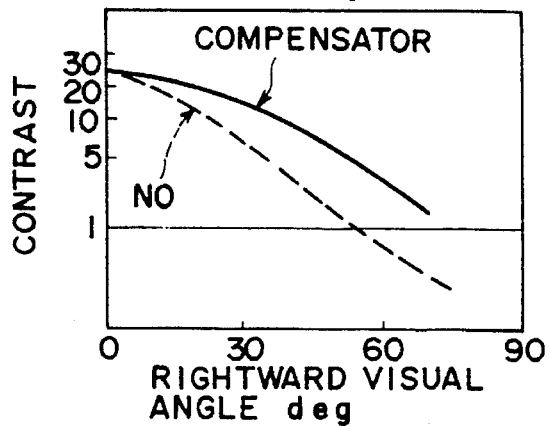

As a result of having checked a compensating effect of this test display, it turned out that the lowering in contrast with increase of the viewing angle became gentle as compared with that in the absence of the viewing angle compensator, as shown in FIG. 2.

Example 4

There was prepared 10.0% solution in tetrachloroethane containing the polymer prepared in Example 1 and an optically active polyester shown in formula (1) at a ratio of 99:1. This solution was applied onto a 1.1 mm thick glass plate having a size of 10 cm×10 cm by a spin coating method, then dried, heat-treated at 220° C. for 30 minutes and thereafter cooled to obtain a transparent film having a thickness of 4.0 μm. As a result of conoscope observation, the film proved to have a positive crystal structure of homeotropic orientation.

The above polymer solution was applied onto a high refraction glass plate by a casting method, then subjected to the same treatment as above and measured for refractive index to find that the refractive index was 1.55 in all of directions parallel to the base and the refractive index in the thickness direction was 1.75.

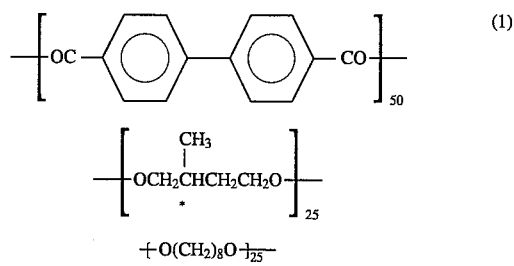

Example 5

The viewing angle compensator obtained in Example 4 was disposed on an upper side of a TN display cell and a comparison was made with the case of not using the viewing angle compensator with respect to the viewing angle dependency. The results obtained are illustrated in FIG. 3.

Example 6

The polymer prepared in Example 1 and the polymer (inherent viscosity: 0.10) of formula (2) were mixed together at a weight ratio of 1:1 to prepare a 15 wt. % solution thereof in tetrachloroethane. Then solution was then applied onto a 100μ thick polyethylene terephthalate film by means of a roll coater, then dried, heat-treated at 180° C. for 15 minutes and then cooled with cold air to solidify, thereby affording a compensator having a compensating layer thickness of 5 μm. Upon conoscope observation, the compensating layer proved to have a positive crystal structure of homeotropic orientation.

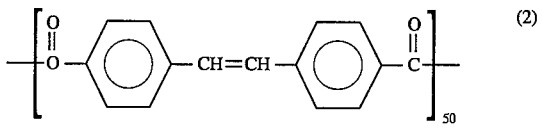

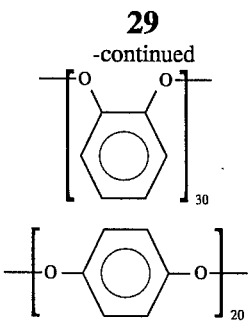

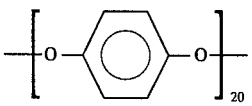

Example 7

A glass plate which had been washed with concentrated sulfuric acid was dipped in a solution of octadecyltriethoxysilane in toluene to form a vertical alignment layer on the glass plate. The composition of formula (3) was dissolved in a mixed chloroethane/phenol (weight ratio 4/6) solvent so as to provide a total polymer concentration of 25 wt. %. Then, the glass plate was dipped in this polymer solution and pulled up for coating of the solution thereon, then allowed to stand at room temperature for 5 hours, then dried at 100° C. for 2 hours and heat-treated at 200° C. for 30 minutes. A transparent film having a thickness of about 5 μm was obtained, but variations in film thickness of ±0.3 were observed in a plane. Upon conoscope observation, the resulting compensating layer proved to have a positive crystal structure of homeotropic orientation.

the coated surface was covered with another raw glass plate, then these glass plates were put onto a hot plate held at 200° C., and the upper glass plate was slightly shifted right and left several times to impart a shear to the polymer. Subsequent cooling could afford a transparent liquid crystal film sandwiched in between the two glass plates. As a result of conoscope observation of this film, clear isogyre was not seen, but when a series of the above operations were performed using high refracting glass plates, not the raw glass plates, and refractive indices were measured, such refractive indices were found to be 1.72 in the thickness direction, 1.57 in the sheared direction and 1.53 in a direction perpendicular thereto.

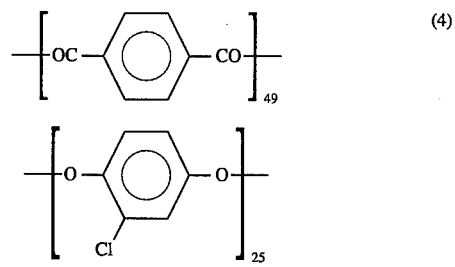

(4)

(A)

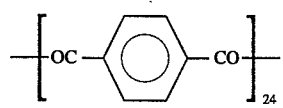

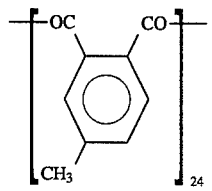

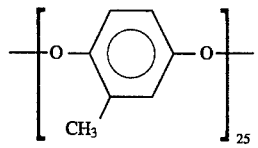

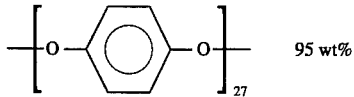 95 wt%

(3)

(B)

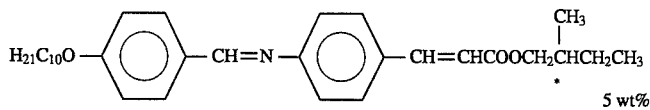

5 wt%

Example 8

There was prepared a 12 wt. % solution of the polymer (inherent viscosity: 0.14, Tg=93° C.) of formula (4) in tetrachloroethane. The solution was then applied onto a raw glass plate by a screen printing method and dried. Further, -continued

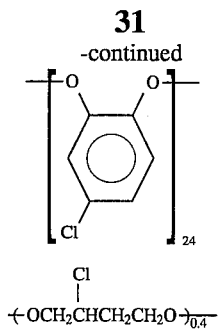

Example 9

The polymer (clarifying point: 250° C., glass transition point: 110° C.) of formula (5) was heat-melted at 280° C, and applied onto a glass base. Then, a shear was imparted to the polymer on a hot plate of 190° C., using a cover glass plate, followed by cooling to afford a transparent liquid crystal film. Upon conoscope observation, the resulting compensating layer was found to have a positive crystal structure of homeotropic orientation.

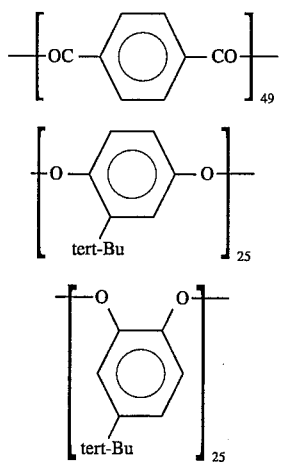

(5)

Example 10

There was prepared a 8 wt. % solution of the polymer (inherent viscosity: 0.18, Tg–75° C.) of formula (6) in tetrachloroethane. The solution was applied on a raw glass plate having a dimension of 10 cm×10 cm and a thickness of 1.1 mm by a spin coating method, dried, heat-treated at 220° C.×45 minutes and cooled to obtain a transparent compensator having a thickness of 0.8 μm. Upon conoscope observation, isogyre was seen at the viewing center and it was found to have a positive crystal structure by inserting a Berek wave plate.

Figure 4:
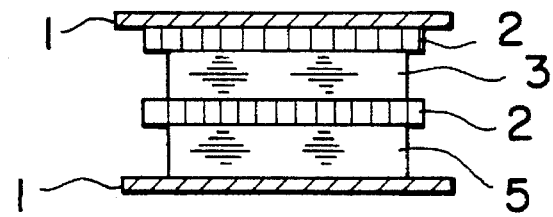
FIG. 4 is a sectional view showing the construction of a two layer cell color-compensated type STN display and view angle compensator.

Another compensator having the same thickness as above was prepared and the two viewing compensators were assembled in STN display having a color compensator as shown in FIG. 4. As a result, a good viewing angle compensating effect as shown in FIG. 5.

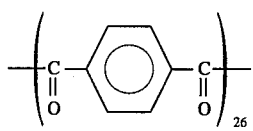

(6)

-continued

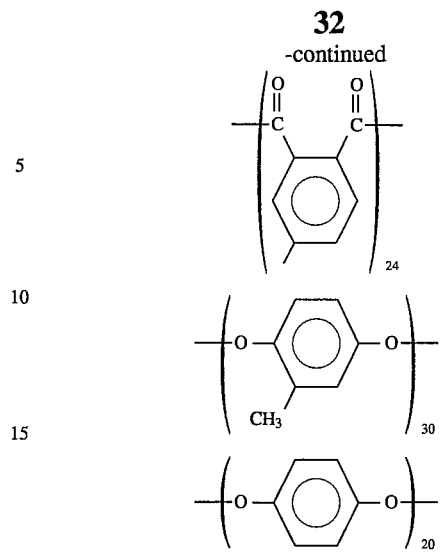

Example 11

Figure 6:
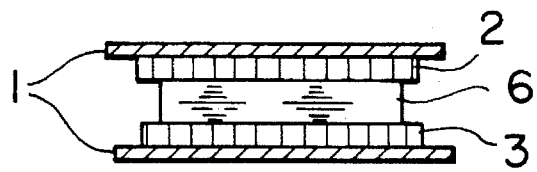
FIG. 6 is a sectional view of the construction of a TN display and viewing angle compensator using in Example 11.

Two viewing angle compensators were prepared by using the polymer solution of Example 10 in the same manner as in Example 10 but by changing the rotation number of the spin coating. The thickness of each compensator was 0.5 μm. There compensators were assembled in a TN display as shown in FIG. 6.

As a result, a change in color tone due to viewing angle was decreased and a viewing angle compensating effect was found.

(Effect of the Invention)

The viewing angle compensator of the present invention comprises a liquid crystalline polymer have a solidified structure wherein the refractive index in the thickness direction is larger than the refractive index at least in one direction within the plane of the polymer, whereby it is possible to reduce the viewing angle dependency which is one serious problem involved in liquid crystal displays. As a result, there can be attained a great contribution to High-grade display of a liquid crystal display unit and the attainment of higher performance. Thus, the viewing angle compensator of the present invention is of extremely high industrial value.

The reference numerals and lines used in the drawings are as follows:

1 . . . polarizing plate
2 . . . viewing angle compensator
3 . . . color compensating cell
4 . . . liquid crystal display cell
5 . . . STN display cell
6 . . . TN cell
Solid line . . . represents the presence of a compensator
Dotted line . . . represents the absence of a compensator
What is claimed is:

1. A viewing angle compensator for a liquid crystal display comprising a light transmitting substrate and a film of a liquid crystalline polyester formed on said substrate, said liquid crystalline polyester in the state of liquid crystal having a structure wherein the refractive index in the thickness direction is greater than the refractive index in any direction within the plane of the polyester and wherein said polyester is in the glassy state at temperatures below the liquid crystal transition point of the polyester.

2. The viewing angle compensator of claim 1 wherein the liquid crystalline polyester exhibits a homeotropic orientation in the state of liquid crystal.

3. The viewing angle compensator of claim 2 wherein the homeotropic orientation is a structure wherein the major molecular axis area is oriented in a direction perpendicular to the substrate or inclined at 45° or less from the normal direction of the substance.

4. The viewing angle compensator of claim 1 wherein the liquid crystalline polyester is a polyester containing an ortho-substituted aromatic unit.

5. A viewing angle compensator for a liquid crystal display comprising disposing on a substrate, a polyester film said film produced by heat-treating a liquid crystalline polyester at a temperature higher than the glass transition point of the polyester and then cooling to a temperature lower than said glass transition point to solidify a structure, wherein said polyester film has a refractive index in the thickness direction greater than the refractive index in any direction within the plane of the polyester.

6. The viewing angle compensator of claim 5 wherein the liquid crystalline polyester is a polyester containing an ortho-substituted aromatic unit.

7. The viewing angle compensator as in claim 1 or 5, wherein the polyester is a composition obtained by mixing a liquid crystalline polyester containing an ortho-substituted aromatic unit and an optically active compound or a liquid crystalline polyester containing an ortho-substituted aromatic unit and an optically active structure.

8. A viewing angle compensator as in claim 1 or 5 wherein the light transmitting substrate is either not subjected to a parallel orientation treatment or is subjected to a vertical orientation treatment.

9. A process for compensating the viewing angle of a liquid crystal display comprising the steps of:
  (a) providing a light transmitting substrate; and
  (b) apply a film of a liquid crystalline polyester onto said substrate, wherein said liquid crystalline polyester in the state of liquid crystal having a structure wherein the refractive index in the thickness direction is greater than the refractive index in any direction within the plane of the polyester and wherein said polyester is in the glassy state at temperatures below the liquid crystal transition point of the polyester.

10. The process according to claim 9 wherein said liquid crystalline polyester exhibits a homeotropic orientation in the state of liquid crystal.

11. The process according to claim 10 wherein the homeotropic orientation is a structure wherein the major molecular axis area is oriented in a direction perpendicular to the substrate or inclined at 45° or less from the normal direction of the substance.

12. The process according to claim 9 wherein said liquid crystalline polyester is a polyester containing an ortho-substituted aromatic unit.

13. A process for compensating the viewing angle of a liquid crystal display using a film produced by the steps of:
  (a) heat treating a liquid crystalline polyester disposed on a substrate at a temperature greater than the glass transition point of the polyester to produce a film; and
  (b) cooling said film to a temperature lower than said glass transition point to solidify a structure wherein the refractive index in the thickness direction is larger than the refractive index at any direction within the plane of the polyester.

14. The process according to claim 13 wherein the liquid crystalline polyester is a polyester containing an ortho-substituted aromatic ring.

15. The process according to claim 9 or 13 wherein the polyester is a composition obtained by mixing a liquid crystalline polyester containing an ortho-substituted aromatic unit and an optically active compound or a liquid crystalline polyester containing an ortho-substituted aromatic unit and an optically active structure.

16. The process according to claim 9 or 13 wherein the light transmitting substrate is either not subjected to a parallel orientation treatment or is subjected to a vertical orientation treatment.

* * * * *

UNITED STATES PATENT AND TRADEMARK OFFICE
CERTIFICATE OF CORRECTION

PATENT NO. : 5,526,150
DATED : June 11, 1996
INVENTOR(S) : Hitoshi Mazaki, et al.

It is certified that error appears in the above-indentified patent and that said Letters Patent is hereby corrected as shown below:

Column 21, line 32: "2-5" should read --2-8--
    Column 22, line 50: "m" should read -- 1/m --
    Column 25, line 41: after "5" delete --;--
    Column 26, lines 6 & 26: "fill" should read --film--

Signed and Sealed this

Third Day of December, 1996

Attest:

BRUCE LEHMAN

Attesting Officer    Commissioner of Patents and Trademarks